United States Patent [19]

Aunspach

[11] Patent Number: 4,860,992
[45] Date of Patent: Aug. 29, 1989

[54] VALVE/ACTUATOR TORQUE OVERLOAD PROTECTOR

[75] Inventor: Dale Aunspach, St. Louis, Mo.

[73] Assignee: Aunspach Controls Co., St. Louis, Mo.

[21] Appl. No.: 221,211

[22] Filed: Jul. 19, 1988

[51] Int. Cl.⁴ .............................................. F16K 31/44
[52] U.S. Cl. ........................................ 251/81; 464/46; 251/292
[58] Field of Search ........................ 251/81, 297, 292; 464/46; 192/30, 12

[56] References Cited

U.S. PATENT DOCUMENTS

| | | | |
|---|---|---|---|
| 2,729,077 | 1/1956 | Holloway | 464/46 |
| 3,441,115 | 4/1969 | Gunther | 251/81 |
| 3,902,334 | 9/1975 | Ryan | 464/46 |

FOREIGN PATENT DOCUMENTS 922687  1/1955  Fed. Rep. of Germany ........ 251/81

*Primary Examiner*—A. Michael Chambers
*Attorney, Agent, or Firm*—Paul M. Denk

[57] ABSTRACT

A valve/actuator torque overload protector is disclosed as operably associated relative to driving and driven members which are pre-set to transmit limited torque during relative rotary movement between the members. A plurality of spring-loaded tapered rollers are mounted on one of the members for driving engagement with complementary detents on the other of the members. The spring-loaded tapered rollers are pre-set relative to the complementary detents* in order to permit limited torque engagement of the driving and driven members during relative rotation thereof. However, upon encountering torque exceeding pre-set limits, the spring-loaded tapered rollers disengage from the complementary detent* to interrupt the transmission of torque between the driving and driven members.

13 Claims, 2 Drawing Sheets

VALVE/ACTUATOR TORQUE OVERLOAD PROTECTOR

BACKGROUND OF THE INVENTION

The present invention relates to a valve/actuator torque overload protector, and more particularly, to a valve/actuator torque overload protector having driving and driven members which are pre-set to transmit limited torque therebetween during rotary movement between the members.

Valve/actuator torque overload protectors are used in conjunction with valve/actuators of water transmission lines, for example, to prevent valve/actuator damage caused by applying too much operating torque to open or close the valve/actuators. In addition to water transmission lines, such devices may also be used in gas or other fluid transmission lines. Obviously, other industrial uses can be made of this type of valve or torque protector. Typically, such devices transmit torque only up to a pre-set amount, and they automatically disengage if the pre-set torque is exceeded. They are also designed to automatically re-set when the applied torque is below a pre-set amount.

As will be appreciated, valve/actuator torque overload protectors prevent valve/actuator damage which not only saves the cost of valve repair, but also the high cost of excavation, removal and replacement of the valve/actuators.

In the prior art, two drive configurations have been commonly employed between driving and driven members in valve/actuator torque overload protectors. One common prior art design has spherical balls in one of the members that operate in conjunction with conical detents in the other member. The other well known prior art design employs cylindrical rollers in one member with mating trough-like detents in the other member. Both of these design operate to allow relative rotation between the driving and driven members only until a pre-set torque is exceeded, in which case, the spherical balls or cylindrical rollers move out-of-register with the corresponding shaped detents to disengage the driving and driven members, and thereby prevent damage to the valve/actuator.

While these prior art designs have worked well for their intended purpose, the contact stress between the spherical ball or cylindrical roller and the mating detents or troughs, as they move out-of-register, causes distortion and wear of the devices, resulting in less precision, inconsistent repeatability, point contact focusing of forces, and consequent shorter product life. These contact stresses are encountered at the corner of the detent or trough, as a spherical ball or cylindrical roller moves out of the detent or trough.

Recognized stress analyst references, such as *Formulas For Stress And Strain* by Raymond J. Roark, Fifth Edition, McGraw Hill Book Company, 1984, show that under equal loads, the contact stress between a cylindrical roller with its length equal to it diameter and a flat surface is about one order of magnitude less than the contact stress between a spherical ball and flat surface.

Even though a cylindrical roller has less contact stress than a spherical ball, the cylindrical roller will always make point contact with the detent or trough corner as it rolls out of the detent during circular motion because the outer end of the cylindrical roller must travel a greater distance than a point on the cylindrical roller which is closer to the center of rotation of the driving and driven members. Thus, as the cylindrical roller exits the detent or trough, it always exits at an inclined angle to the detent or trough corner, thereby causing point contact with resulting high contact stress.

Other disadvantages in current valve/actuator torque overload protectors include the lack of a seal, the inability to adjust the trip torque, the requirement of disassembling the device to adjust the trip torque, and the necessity of complicated and expensive designs in prior art designs to achieve desired results.

SUMMARY OF THE INVENTION

Among the several objects and advantages of the present invention may be noted:

The provision of a valve/actuator torque overload protector which overcomes the aforenoted deficiencies of the prior art;

The provision of the aforementioned valve/actuator torque overload protect which permits positive and reliable actuator disengagement of driving and driven members when a pre-set torque is encountered;

The provision of the aforementioned valve/actuator torque overload protector which allows automatic re-engagement upon further shaft rotation once the overload condition has been corrected, with the re-engagement taking place in such a way as to provide correct rotary timing or specific angular positioning of the driven member with respect to the driving member, although such is not a required feature;

The provision of the aforementioned valve/actuator torque overload protector which operates in either open or close direction or rotation;

The provision of the aforementioned valve/actuator torque overload protector which theoretically provides greater torque capacity with more precision and repeatable trip torque, and with resulting longer life as compared to prior art devices;

The provision of aforementioned valve/actuator torque overload protector which utilizes tapered rollers and complementary-shaped detents or bearing seats to provide line rather than point contact with the corner of the detent as the tapered roller moves out of register with the complementary detent, thus significantly decreasing stress with resulting greater precision, better repeatability and longer life;

The provision of the aforementioned valve/actuator torque overload protector which is: easily installed on buried valves without excavation; mounts directly on standard two-inch AWWA operating nuts; provides a sealed mechanism for reliable, long-term operation in buried and submerged or dirty water environments; is corrosion protected including having a cast iron body that is a epoxy coated inside and outside; has zero maintenance; is permanently lubricated; has a rugged, built-to-last construction; is tamper-proof so as to prevent unauthorized torque adjustment; has a unique high-strength low-wear mechanism insuring reliable operation and extra-long life; may be easily adjusted from outside; and is otherwise well adapted for the purposes intended.

Briefly stated, the valve/actuator torque overload protector of the present invention is constructed for use between driving and driven members that are pre-set to transmit limited torque during relative rotary movement of the members. A plurality of spring-loaded tapered rollers are operably associated with one of the members for engaging complementary detents on the other of said members. The spring-loaded tapered rollers are pre-set relative to the complementary detents to permit limited torque engagement of the driving and driven members during rotation thereof. Upon encountering torque exceeding pre-set limits, the spring-loaded tapered roller disengage from the complementary detents to interrupt the transmission of torque between the members.

The diameter of the tapered rollers progressively increases along the length thereof in direct proportion to the radial distance from the center of rotation of the driving and driven members, and the tapered rollers each have an axis that extends perpendicular to the center of rotation.

Spring elements are interposed between the tapered rollers and one of the members for spring loading the tapered rollers a pre-set amount relative to the complementary detents of the other members to permit limited torque of the driving and driven members during rotation thereof.

Adjustment means are provided for engaging the spring elements to adjust spring loading of the tapered rollers relative to the complementary detents, to vary the pre-set limited driving torque between the driving and driven members. The adjustment means includes an adjusting screw having its head extending outside of the torque overload protector for adjusting the spring loading of the spring elements relative to the tapered rollers.

Other and further objects and advantages of the present invention will become more apparent from the ensuing description.

BRIEF DESCRIPTION OF THE DRAWINGS

In the drawings.

Corresponding reference numerals will be used throughout the various figures of the drawings.

DESCRIPTION OF PREFERRED EMBODIMENT

Figure 2:
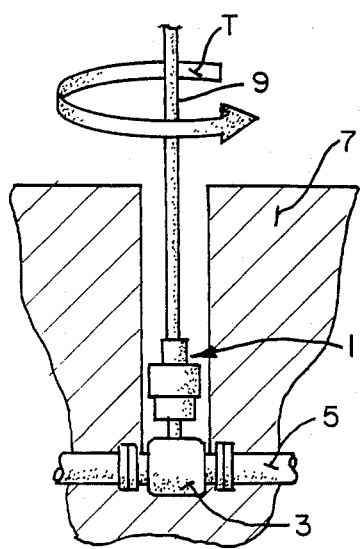
FIG. 2 is a reduced-in-size side elevational view, partly in section, illustrating the typical environment in which the valve/actuator torque overload protector of the present invention is used.

The valve/actuator torque overload protector 1 of the present invention is shown in FIG. 2 of the drawings in the typical environment in which it is to be used.

The valve/actuator torque overload protector 1 is illustrated as being mounted relative to the valve 3 located within the water or other fluid or gas transmission line 5 and positioned beneath ground 7, as is well known. An elongated rod 9 having suitable mating surfaces for engagement with the valve-actuator torque overload protector 1, as will become apparent, is utilized to rotate the valve/actuator 1, applying torque T in the direction of the arrow as shown in FIG. 2. By rotating or turning the valve/actuator torque overload protector 1, the valve 3 is opened or closed to open or close water fluid flow in the transmission line 5, as will be apparent.

Figure 1:
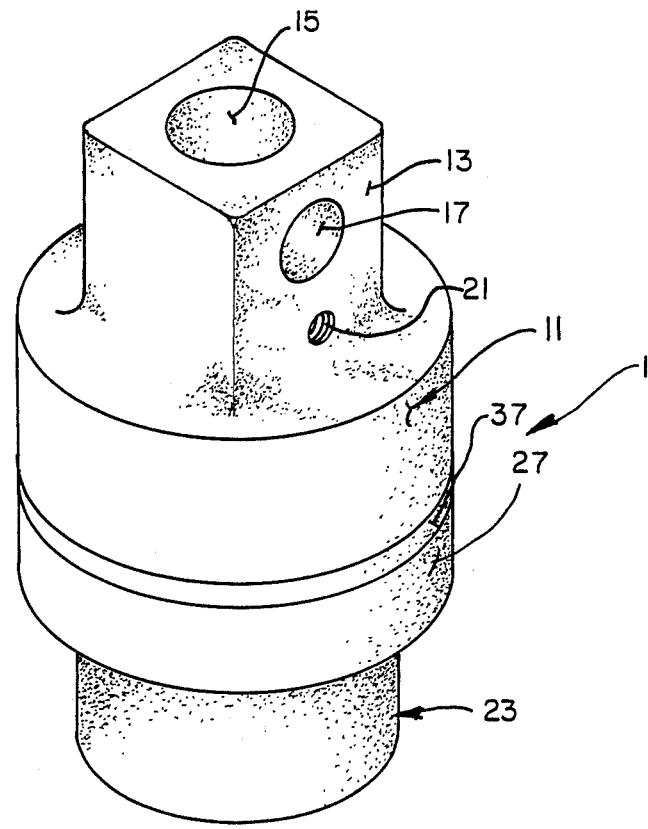
FIG. 1 is an isometric view of a valve/actuator torque overload protector constructed in accordance with the teachings of the present invention.

The construction of the valve/actuator torque overload protector 1 of the present invention is illustrated in FIGS. 1 and 3-7 of the drawings. In FIG. 1, the valve/actuator torque overload protector 1 is shown as including an upper or driving member 11 with an integral standard two-inch AWWA operating nut 13 that can be engaged by the elongated rod 9 for operating the valve/actuator torque overload protector 1. Axial and radial openings 15, 17 are provided in the operating nut 13, to permit exposure to the adjusting screw 19 shown in FIG. 4 of the drawings, for adjusting the amount of pre-set torque desired, as will become apparent. A set screw opening 21 is also provided in the operating nut 13 for receiving a set screw (not shown) for engaging and holding the adjusting screw 19 in the desired position after the desired torque adjustment has been made.

The valve/actuator torque overload protector 1 further includes a lower or driven member 23 having a standard two-inch AWWA operating socket 25 for engagement with a complementary configured elongated rod 9, when the member 23 becomes the driving member and the member 11 becomes the driven member. Thus, as will be understood, the other end of the valve/actuator torque overload protector 1 may be mounted to the valve 3 such that either member 11 or member 23 becomes the driving member.

For purposes of the discussion that is to follow, the upper member 11 will be considered the driving member while the lower member 23 will be considered the driven member in the valve/actuator torque overload protector 1 of the present invention, although their roles may be reversed as discussed above.

It will be noted that the lower member 23 is secured to the upper member 11 by an annular ring 27 that is bolted by bolts 29 to the upper member 11. The annular ring 27 includes an internal shoulder 31 that underlies an overhanging shoulder 33 of the lower member 23 in order to allow the annular ring 27, through the bolts 29, to draw and position the lower member 23 relative to the upper member 11 as illustrated in the drawings.

Figure 4:
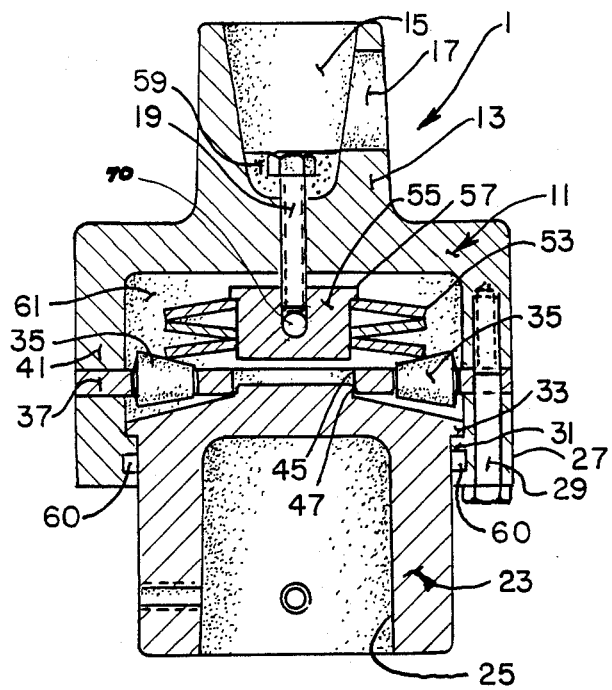
FIG. 4 is a sectional view of the valve/actuator torque overload protector of the present invention.
Figure 5:
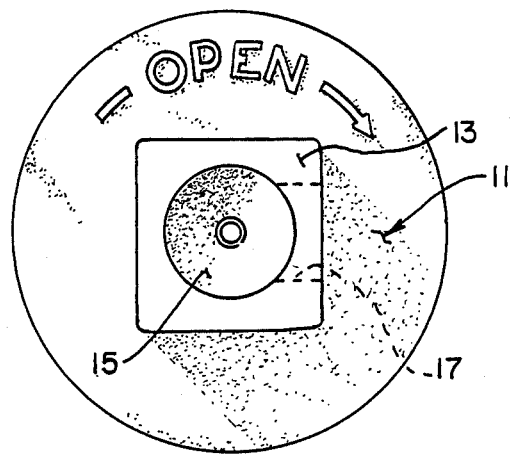
FIG. 5 is a top plan view of the valve/actuator torque overload protector as illustrated in FIG. 1 of the drawings.
Figure 7:
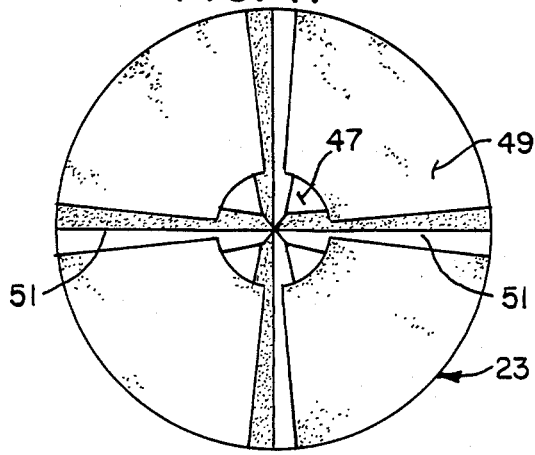
FIG. 7 is a top plan view of the complementary shaped detents or troughs formed in an upper surface of the driven member in the valve/actuator torque overload protector of the present invention.
Figure 6:
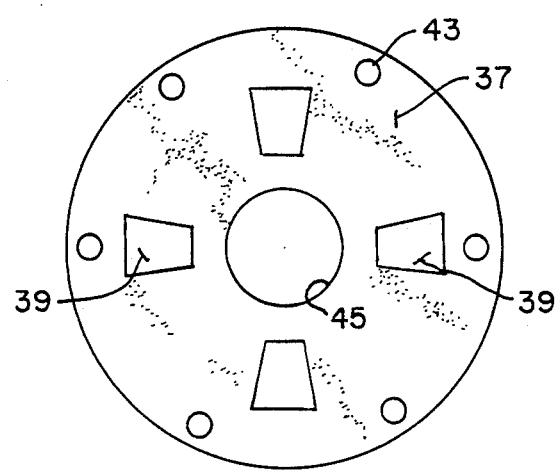
FIG. 6 is a top plan view of the retainer used to circumferentially surround and support the tapered rollers incorporated within the valve/actuator torque overload protector of the present invention.
Figure 8:
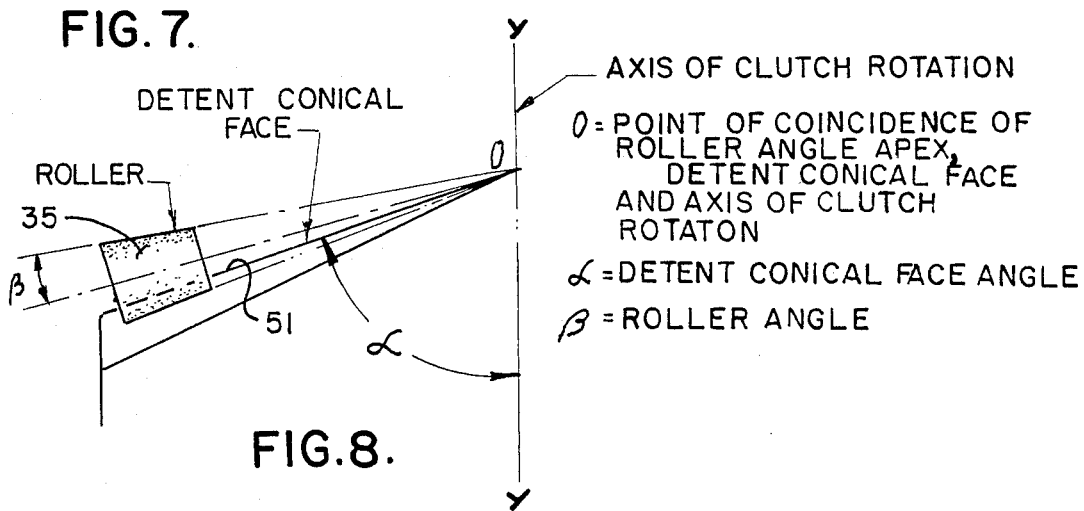
FIG. 8 is a diagrammatic representation illustrating the various angular relationships between the tapered roller angle and the detent conical face angle in the valve/actuator torque overload protector of the present invention.

In order to operate as a torque limiting overload protector, so as to prevent valve damage caused by the application of too much operating torque, the present invention utilizes a plurality of tapered rollers 35 as shown in FIG. 4 of the drawings which have the roller angle as shown in FIG. 8 of the drawings The tapered rollers 35 are circumferentially received within and supported by a retainer or drive plate 37 having a corresponding member of tapered roller openings 39 suitably large enough to accommodate the tapered rollers 35 therein without interference. As shown in FIG. 4 of the drawings, the retainer 37 is mounted between the upper face of the annular ring 27 and the lower face of a circumferentially depending flange 41 of the upper or driving member 11, and has a plurality of spaced openings 43 for receiving the bolts 29 therethrough in order to allow the bolts 29 to be threadably mounted relative to the annular depending flange 41 of the upper or driving member 11, as shown in FIG. 4 of the drawings. The retainer 37 further includes a centrally positioned opening or bore 45 for centrally mounting the retainer 37 over the upstanding centrally positioned boss or shoulder 47 that projects upwardly from the upper face 49 of the lower or driven member 23, as illustrated in FIGS. 4 and 7.

The tapered rollers 35 are constructed to be received and retained within the complementary shaped detents or bearing seats 51 formed in the upper face 49 of the lower or driven member 23, when the torque is operated below a pre-set level or amount. As illustrated in FIG. 8 of the drawings, the complementary shaped detents 51 have a detent conical face angle that is complementary shaped relative to the roller angle of the tapered rollers 35, for purposes which will become apparent.

In order to pre-set the disengagement torque between the tapered rollers 35 and the complementary detents 51, spring elements in the form of opposed Belleville spring washers 53 are mounted upon the internal cylindrical collar 55 which has an upper shoulder 57 for engaging the uppermost Belleville spring washer 53 to engage and releasably clamp the Belleville spring washers 53 between the upper shoulder 57 and the tapered rollers 35, as shown in FIG. 4 of the drawings. To adjust the amount of disengagement torque between the tapered rollers 35 and the complementary detents 5!, the adjusting screw 19 extends through the upper or driving member 11 and is threadably engaged therewith, and disposed relative to the internal cylindrical collar 55 for raising or lowering the cylindrical collar 55 to lower or increase the amount of pre-set disengagement torque required before the tapered rollers 35 become disengaged from the complementary detents 51.

As best seen in FIG. 4 of the drawings, torque applied to the operating nut 13 is transmitted through the upper or driving member 11 and bolts 29 to the drive plate or retainer 37. The rotating drive plate or retainer 37 carries the tapered rollers 45 so that the torque is further transmitted through the plurality of tapered rollers 35 through the complementary detents 51 of the lower or driven member 23. As long as the applied torque is below the pre-set threshold disengagement torque, as determined by the amount of spring force applied to the tapered rollers 35, the driving member 11 will drive the driven member 23 through the complementary tapered rollers 35 and complementary detents 51. The magnitude of the torque that can be transmitted, without disengagement, depends upon the amount of force that is applied to the tapered rollers 35 forcing them downwardly by the spring action into engagement with the matching complementary detents 51. As has been explained above, the downward force, and hence the disengagement torque, is adjustable by means of the adjusting screw 19 operating via the internal cylindrical collar 55 on the spring elements in the form of opposed Belleville spring washers 53.

If the applied torque becomes greater than the pre-set disengagement torque or trip torque, the excess torque will cause the tapered rollers 35 to move up out of the complementary detents 51 so that they are out-of-engagement or out-of-register with one another. When this occurs, torque can no longer be transmitted between the driving member 11 and the driven member 23. At this point, the valve/actuator torque overload protector 1 will remain disengaged and will not transmit further torque until the applied torque has been reduced below the pre-set trip torque amount or level.

After disengagement of the tapered rollers and complementary detents 35, 51, respectively, and after the applied torque has been reduced to a level or amount less than the pre-set trip torque, the torque overload protector 1 will automatically re-engage upon further rotation of either the driving or driven member relative to the other. The amount of relative rotation required to re-engage the tapered rollers 35 within the complementary detents 51 depends upon the number and spacing of the tapered rollers 35 and complementary detents 51. In most instances, it usually is one revolution or less. By means of an irregular spacing of the tapered rollers 35 and complementary detents 51, it is possible to control re-engagement thereof such that the driving and driven members 11, 23 respectively will always re-engage in the same angular position relative to one another prior to disengagement.

As shown in FIG. 8 of the drawings, the relationship between the tapered roller 35 angle relative to the complementary detent 51 conical face angle and the axis of torque overload protector I rotation is shown. In order for th tapered roller drive to function properly, the relationship between the tapered roller 35 and the complementary detents 51 must be interrelated to one another as shown in FIG. 8 of the drawings. It will be noted that the apex of the tapered roller angle must be located on the axis of the clutch or torque overload protector rotation. Also, the apex of the detent conical face must coincide with the apex of the roller angle.

It will be further noted that the axis of the tapered rollers 35, as shown in the FIG. 4 illustration, extend substantially perpendicular to the axis or center of rotation of the clutch or torque overload protector 1. Furthermore, as illustrated in FIG. 4 of the drawings, the complementary detent 51 engage less than one-half of the tapered rollers 51, with said tapered rollers 35 also projecting above the retainer or drive plate 37 carried by the drive member 11. By engaging less than one-half of the tapered rollers 35, the complementary detent 51 facilitate movement of the tapered rollers 35 out-of-register therewith, without substantial binding or interference. Also, as has been explained previously, the spring elements, in the form of the opposed Belleville spring washers 53, are constructed to engage the tapered rollers 35 as they project upwardly beyond the retainer or drive plate 37, in order that a suitable amount of downward force on the tapered rollers 35 may be applied to regulate the disengagement or trip torque.

As explained in the introduction above, the prior art spherical ball or cylindrical roller/complementary detent drives have substantial contact stress between the spherical ball or cylindrical rollers, as they move out-of-engagement with the complementary detents thereof, when disengagement or trip torque is reached. With the tapered rollers 35 and complementary detents 51 of the present invention, in the environment of the torque overload protector 1 as described above, there will be significantly lower contact stress between the tapered rollers 35 and complementary detents 51, thereby causing less distortion than would be the case with the spherical and straight cylindrical roller drives of the prior art. This results in greater precision, better repeatability, longer life, and greater trip torque, all in a more compact overall design, than prior art designs.

The greater the radial distance from the center of rotation of the torque overload protector 1, the farther each tapered roller 35 must travel with respect to its complementary detent 51, as it disengages. The tapered rollers 35 and complementary detents 51 of the present invention are constructed such that the roller diameter is directly proportional to the radial distance from the center of rotation of the torque overload protector or clutch 1. This allows the tapered rollers to maintain line, rather than point, contact with the corner of the complementary detents 51 as they move-out-of-engagement or out-of-register therewith. The tapered rollers 35 permit rolling rather than sliding action upon disengagement from the complementary detents 51, resulting in substantially lower friction that provides the above described advantages.

It is to be noted at the base of adjusting screw 19, where it locates within the opening provided centrally of the cylindrical collar 55, there is provided a ball bearing, as at 70, and the purpose of said bearing is to allow the Belleville spring washers 53 to freely rotate not only upon the tapered rollers 35, when disengagement of the rollers occurs from within the bearing seats 51, but likewise when any relative rotation occurs, of the rollers 35, upon the surface or upper face 49, of the driven member 23. Thus, this further facilitates the rotation of the said spring washers, upon the bearings, so as to reduce any sliding friction, if not totally eliminate the same, relative these two components, and to enhance the trip repeatability of the device, during its usage and application. Obviously, this adds to the useful life of the overload protector, during its application.

Although the description set forth above has referred to the upper member !1 as the driving member and the lower member 23 as the driven member, it will be understood that as a result of the two-inch AWWA socket 25 provided in the lower member 23, the latter may become the driving member in a particular arrangement. As a result, torque can be transmitted equally to the torque overload protector 1 from either end of the torque overload protector 1, and in either clockwise or counterclockwise direction, as may be desired.

To provide a corrosion protected and sealed mechanism, the upper and lower members 11, 23 are preferably formed from cast iron and are epoxy coated inside and outside. To sealingly encase the torque overload protector 1, suitable gaskets (not shown) may be provided on either side of the retainer or drive plate 37, and a sealing caulk or the like 59 may be applied over the head of the adjusting screw 19 to totally encase the torque overload protector 1 in a sealed environment. Also, a gasket, as at 60, may be provided within the ring 27 to prevent the escape of lubrication from within the chamber 61, or to prevent the entrance of moisture therein. This enables the torque overload protector 1 to be used for the long term, and even in a buried and submerged environment, if required.

With a sealed environment, the operating components, including the tapered rollers 35 and complementary detents 51, may be permanently lubricated, thus requiring zero maintenance. The tamper-proof construction prevents unauthorized torque adjustment. However, if such is required, it is a relatively simple matter to remove the sealing caulk and turn the adjusting screw 19 to apply a greater or lesser amount of force on the spring elements 53, to apply the desired disengagement or trip torque.

Figure 3:
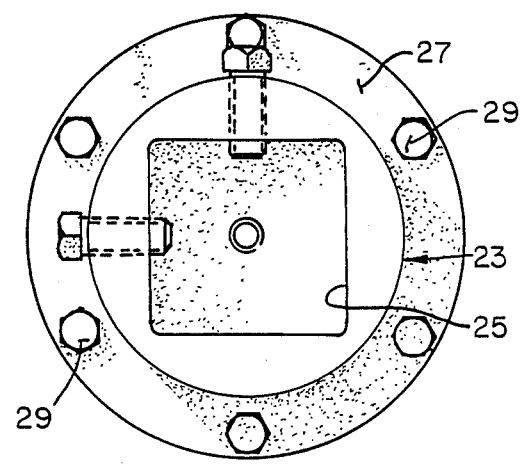
FIG. 3 is a bottom plan view of the valve/actuator torque overload protector illustrated in FIG. 1.

Also, as can be seen in FIG. 3, the device can be fixedly mounted through the use of bolts upon the top of the valve 3, as can be noted in FIG. 2.

From the foregoing, it will be appreciated that the valve-actuator torque overload protector of the present invention, through the use of the tapered rollers and complementary detents, in one or the other of the drive and driven members thereof, may be operated to automatically disengage when subjected to excessive force the driving and driven members from one another if pre-set torque is exceeded, but then are automatically re-set when the applied torque reduces to below the pre-set amount. The rolling action of the tapered rollers as they are moved out-of-register with the complementary detents, upon torque disengagement, results in substantially lower friction that provides more consistent and repeatable trip torque than has been possible with prior art designs. In addition, greater trip torque capacity is possible, and much longer life of the units is also achieved.

In view of the above, it will be seen that the several objects and features of this invention have been achieved and other advantageous results have been obtained.

As various changes could be made in the above constructions without departing from the scope of the invention, it is intended that all matter contained in the above description or shown in the accompanying drawings shall be interpreted as illustrative and not in a limiting sense.

I claim:

1. In a valve/actuator torque overload protector having driving and driven members pre-set to transmit limited torque between the members, the improvement comprising: spring-loaded tapered rollers operably associated with one of said members for engaging complementary detents on the other of said members, said spring-loaded tapered rollers being pre-set relative to said complementary detents to permit limited torque engagement of said driving and driven members during relative rotation thereof, such that upon encountering torque pre-set limits, the spring-loaded tapered rollers disengage from said detents to interrupt the transmission of torque between said members, the diameter of said tapered rollers progressively increases along the path thereof in direct proportion to the radial distance from the center of rotation of said driving and driven members, said tapered rollers each having an axis extending perpendicular to said center of rotation.

2. The improvement as defined in claim 1 wherein said complementary detents are provided in a complementary surface of said driven member, and said tapered rollers being spring loaded relative to said driving member for spring loading the tapered rollers within the complementary detents of said driven member.

3. The improvement as defined in claim 2 wherein said driving member is superimposed above said driven member.

4. The improvement as defined in claim 3 wherein said tapered rollers are circumferentially supported within a retainer carried by said driving member.

5. The improvement as defined in claim 4 wherein said complementary detents engage less than half of said tapered rollers and said tapered roller also project above said retainer carried by said driving member.

6. The improvement as defined in claim 5 and including spring elements interposed between said driving member and said tapered rollers for spring loading said tapered rollers within the complementary detents of said driven member.

7. The improvement as defined in claim 6 and including an internal cylindrical collar supported from said driving member and surrounded by said spring elements, said cylindrical collar including an upper shoulder for engaging and holding said spring elements with predetermined spring loading relative to said tapered rollers.

8. The improvement as defined in claim 7 and including an adjusting screw extending outside and also through said driving member for raising and lowering said cylindrical collar to adjust the spring loading of said tapered rollers relative to said complementary detents.

9. The valve/actuator torque overload protector as defined in claim 8 wherein the diameter of said tapered rollers progressively increases along the length thereof in direct proposition to the radial distance from the center of rotation of said driving and driven members, said tapered rollers each having an axis extending perpendicular to said center of rotation, and said complementary detents engage less than half of said tapered rollers.

10. The valve/actuator torque overload protector as defined in claim 9 wherein said driving member and said tapered rollers are mounted to said driving member includes an adjusting screw having an exposed head extending outside of said protector for adjusting the spring loading of said spring elements relative to said tapered rollers.

11. A valve/actuator torque overload protector for driving and driven members comprising, said protector for use in combination with the valve associated with a water or other fluid or gas transmission line, and said valve having means thereon for accommodating the mating engagement of said overload protector, said protector including said driving and driven members, a plurality of spring-loaded tapered rollers mounted on one of said members for driving engaging with complementary detents on the other of said members, said spring-loaded tapered rollers being pre-set relative to said complementary detents to permit limited torque of said driving and driven members during relative rotation thereof, such that upon encountering torque exceeding pre-set limits, the spring-loaded tapered rollers disengage from said detents to interrupt the transmission of torque between said members, and to limit the extent of closure of said valve during its manipulation.

12. A valve/actuator torque overload protector for driving and driven members comprising, a plurality of spring-loaded tapered rollers mounted on one of said members for driving engagement with complementary detents on the other of said members, said complementary detents engage less than half of said tapered rollers, the diameter of said tapered rollers progressively increasing along the length thereof in direct proportion to the radial distance from the center of rotation of said driving and driven members, said tapered rollers each having an axis extending perpendicularly to said center of rotation, spring elements interposed between said tapered rollers and one of said members for spring loading said tapered rollers a pre-set amount relative to the complementary detents of said other member to permit limited torque of said driving and driven members during relative rotation thereof, and adjustment means for engaging said spring elements to adjust the spring loading of said tapered rollers relative to said complementary detents to vary the pre-set limited driving torque between said driving and driven members.

13. A valve/actuator torque overload protector for use in conjunction with a water valve, said protector having driving and driven members, comprising, a plurality of spring-loaded tapered rollers mounted on of said members for driving engagement with complementary detents on the other of said members, the diameter of said tapered rollers progressively increasing along the length thereof in direct proportion to the radial distance from the center of rotation of said driving and driven members, said tapered rollers each having an axis extending perpendicular to said center of rotation, spring elements interposed between said tapered rollers and one of said members for spring loading said tapered rollers a pre-set amount relative to the complementary detents of said other member to permit limited torque of said driving and driven members during relative rotation thereof, and adjustment means for engaging said spring elements to adjust the spring loading of said tapered rollers relative to said complementary detents to vary the pre-set limited driving torque between said driving and driven members.

* * * * *

UNITED STATES PATENT AND TRADEMARK OFFICE
CERTIFICATE OF CORRECTION

PATENT NO. : 4,860,992
DATED : August 29, 1989
INVENTOR(S) : Dale Aunspach

It is certified that error appears in the above—identified patent and that said Letters Patent is hereby corrected as shown below:

Claim 1, column 8, line 46, change "path" to ---length---.

Claim 9, column 9, line 19, change "proposition" to ---proportion---.

Claim 13, column 10, line 28, insert after "on" and before "of" ---one---.

Signed and Sealed this

Twenty-fourth Day of July, 1990

Attest:

HARRY F. MANBECK, JR.

*Attesting Officer*  *Commissioner of Patents and Trademarks*